United States Patent
Seifried et al.

(10) Patent No.: US 8,631,572 B2
(45) Date of Patent: Jan. 21, 2014

(54) METHOD FOR THE PRODUCTION OF A PISTON FOR AN INTERNAL COMBUSTION ENGINE

(75) Inventors: Matthias Seifried, Boesingen (DE); Kevin Speck, Morristown, TN (US)

(73) Assignee: MAHLE International GmbH, Stuttgart (DE)

( * ) Notice: Subject to any disclaimer, the term of this patent is extended or adjusted under 35 U.S.C. 154(b) by 347 days.

(21) Appl. No.: 12/928,105

(22) Filed: Dec. 3, 2010

(65) Prior Publication Data

US 2011/0192023 A1 Aug. 11, 2011

(30) Foreign Application Priority Data

Dec. 3, 2009 (DE) .......................... 10 2009 056 917

(51) Int. Cl.
*B23P 15/10* (2006.01)
*B23K 20/12* (2006.01)
(52) U.S. Cl.
USPC ................ 29/888.04; 29/888.049; 29/888.05; 72/352; 92/231; 228/2.1; 228/2.3; 228/112.1
(58) Field of Classification Search
USPC ........... 29/888.07, 888.092, 888.451, 888.09, 29/888.049, 888.04; 72/352; 76/5.4; 148/649; 92/231, 186, 219; 419/27; 228/2.1, 2.3, 112.1
See application file for complete search history.

(56) References Cited

U.S. PATENT DOCUMENTS

| | | | | |
|---|---|---|---|---|
| 4,569,109 A * | 2/1986 | Fetouh | ....................... | 29/888.09 |
| 5,051,232 A * | 9/1991 | Summers | ....................... | 419/27 |
| 5,778,533 A * | 7/1998 | Kemnitz | ................. | 29/888.049 |
| 6,526,871 B1 * | 3/2003 | Zhu et al. | ........................ | 92/231 |
| 7,104,183 B2 * | 9/2006 | Huang | ............................. | 92/186 |
| 7,578,229 B2 | 8/2009 | Dye | | |
| 7,918,022 B2 * | 4/2011 | Huang | ....................... | 29/888.04 |
| 8,074,617 B2 * | 12/2011 | Grahle et al. | ............. | 123/193.6 |
| 8,286,852 B2 * | 10/2012 | Kolbe et al. | ................ | 228/112.1 |
| 2005/0034598 A1 * | 2/2005 | Ribeiro et al. | .................. | 92/186 |
| 2008/0066615 A1 * | 3/2008 | Rasmussen | ..................... | 92/219 |
| 2008/0127818 A1 * | 6/2008 | Dye | ................................ | 92/186 |

FOREIGN PATENT DOCUMENTS

DE    600 28 800    5/2007

OTHER PUBLICATIONS

German Search Report dated Jul. 27, 2010 with English translation of the relevant parts.

* cited by examiner

*Primary Examiner* — Alexander P. Taousakis
*Assistant Examiner* — Lee Holly
(74) *Attorney, Agent, or Firm* — Collard & Roe, P.C.

(57) ABSTRACT

A method for the production of a piston for an internal combustion engine, in which a piston blank is forged, which is subsequently separated into two parts, to form an upper piston part and a lower piston part, after which the lower piston part and the upper piston part are machined and then welded to one another. Subsequently, the piston is finished. During forging of the piston blank, the top of the piston blank is partly given the shape of the underside of the upper piston part, and the underside of the piston blank is given the shape that corresponds to the interior of the lower piston part. After forging of the piston blank and before separation of the upper piston part from the lower piston part, the top of the piston blank is given the finished shape of the underside of the upper piston part by a cutting machining method.

5 Claims, 7 Drawing Sheets

METHOD FOR THE PRODUCTION OF A PISTON FOR AN INTERNAL COMBUSTION ENGINE

CROSS REFERENCE TO RELATED APPLICATIONS

Applicants claim priority under 35 U.S.C. §119 of German Application No. 10 2009 056 917.0 filed Dec. 3, 2009, the disclosure of which is incorporated by reference.

BACKGROUND OF THE INVENTION

1. Field of the Invention

The invention relates to a method for the production of a piston for an internal combustion engine, having a ring-shaped cooling channel that lies radially on the outside, and a cooling chamber that lies in the center, comprising the following method steps:

forging a piston blank, from which an upper piston part and a lower piston part are formed,
separating the upper piston part from the lower piston part,
machining a piston part to form recesses for a ring-shaped cooling channel,
welding the upper piston part to the lower piston part,
finish-machining the piston to produce piston ring grooves, pin bores, and a combustion chamber bowl.

2. The Prior Art

A method for the production of a piston for an internal combustion engine, of the type stated initially, is known from the U.S. patent application 2008/0127818. In this connection, after the piston blank is separated into pieces, both the part provided for the upper piston part and the part provided for the lower piston part must be machined using a cutting machining process, and this brings with it a not insignificant expenditure of time and costs.

SUMMARY OF THE INVENTION

It is the task of the invention to avoid this disadvantage of the state of the art, and to simplify the known method for the production of a piston for an internal combustion engine and to make it cheaper.

This task is accomplished in that the top of the piston blank is partly given the shape of the underside of the upper piston part, and the underside of the piston blank is given a shape that corresponds to the interior of the lower piston part, already during forging of the piston blank, that after forging of the piston blank and before separation of the upper piston part from the lower piston part, pin bores are introduced into regions of the piston blank intended for the pin bosses, and the top of the piston blank is given the finished shape of the underside of the upper piston part by means of a cutting machining method, and that after separation of the upper piston part from the lower piston part, and before welding of the upper piston part to the lower piston part, the surface of the lower piston part on the piston crown side is finish-machined.

In this way, the result is achieved that after separation of the upper piston part from the lower piston part, and before welding of these two parts, only the lower piston part has to be processed further by means of a cutting processing method, and this leads to making the production process cheaper.

Practical embodiments of the invention are the object of the dependent claims.

BRIEF DESCRIPTION OF THE DRAWINGS

An exemplary embodiment of the invention will be described in the following, using the drawings. These show.

DETAILED DESCRIPTION OF PREFERRED EMBODIMENTS

Figure 1:
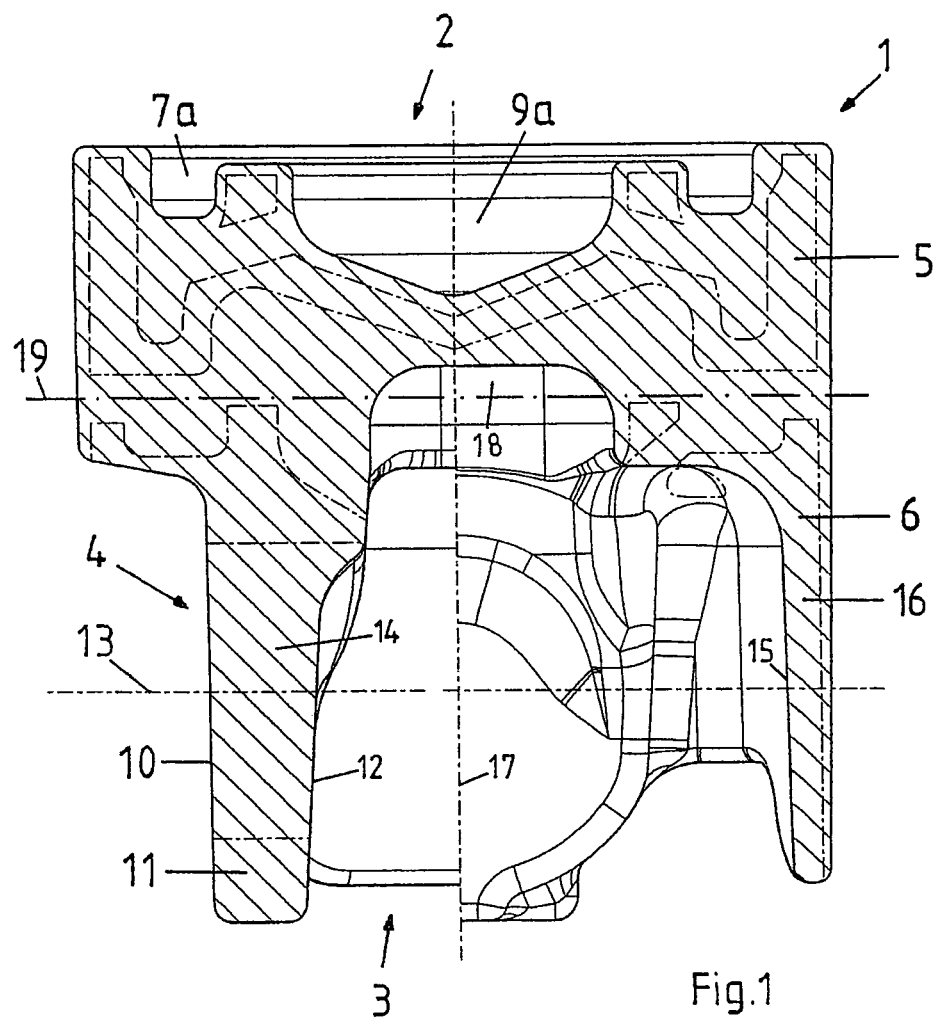
FIG. 1 a forged piston blank in the unfinished state,
FIG. 2 the piston blank with pin bore introduced, and finish-lathed top,
FIG. 3 the piston blank after separation of the upper piston part from the lower piston part,
FIG. 4 the lower piston part with finish-lathed top,
FIG. 5 the upper piston part and the lower piston part within the scope of the welding process,
FIG. 6 the partly finished piston after welding of the upper piston part to the lower piston part,
FIG. 7 the finished piston after final machining.

FIG. 1 shows a piston blank 1 in section, whereby the left half of the sectional image shows the piston blank 1 along the axis 13 of the pin bore 14 that is shown with a dot-dash line and was introduced into the piston blank 1 during the course of the production process, and the right half of the sectional image lies perpendicular to this.

The piston blank 1 consists of steel or aluminum, whereby the top 2 is formed, within the scope of a forging process, using an upper forging die, and the interior 3 and the side surfaces 4 of the piston blank 1 are formed using a lower forging die.

Within the scope of the production process that will be explained in greater detail below, an upper piston part 5 and a lower piston part 6 are produced from the piston blank 1, which parts are shown with dot-dash lines in FIG. 1, in such a manner as they are configured after completion of the piston. It can be seen that the top 2 of the piston blank 1 is roughly given the shape, within the scope of the forging process, that corresponds to the underside of the upper piston part 5, whereby a recess 7a for a closed cooling channel, disposed on the underside of the upper piston part 5 after completion of the piston, and a recess 9a for a centrally located cooling chamber are partly formed into the top 2 of the piston blank 1.

Within the scope of forging of the piston blank 1, set-back radially outer face sides 10 are furthermore formed into regions of the piston blank 1 that are intended as pin bosses 11, in two regions of the radially outer surface 4 of the piston blank 1 that lie opposite one another.

During forging of the interior 3 of the piston blank 1 using the lower forging die, the radially inner face sides 12 of the pin bosses 11 and the insides 15 of the skirt elements 16 are already formed to such an extent as they are configured after completion of the piston. For the remainder, the upper part 18 of the interior 3 that lies in the region of the piston axis 17 is forged to such an extent that it comes to lie closer to the top 2 of the piston blank 1 than the parting plane 19, along which the piston blank 1 is divided during the course of the production process, in order to subsequently be able to machine the lower piston part 6.

Figure 2:
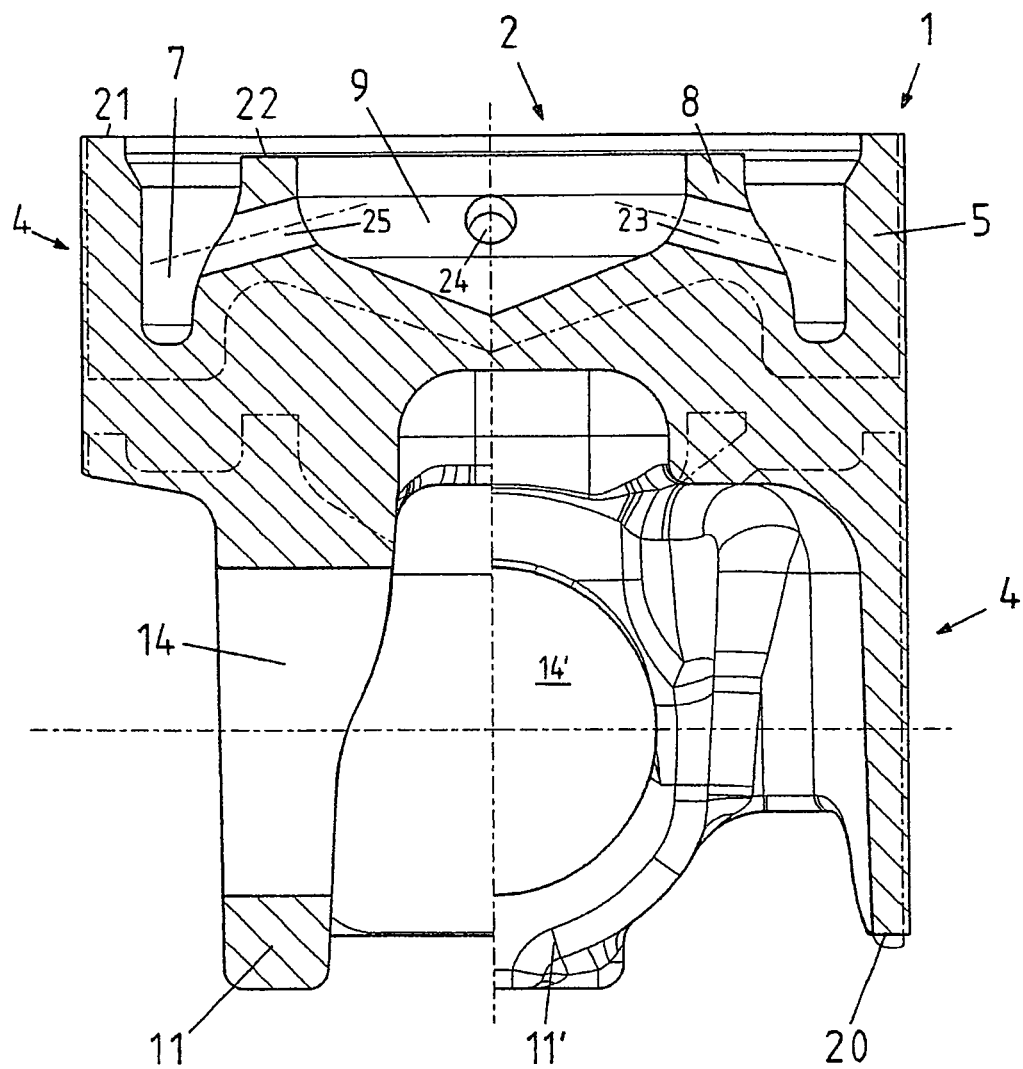

Within the scope of further machining of the piston blank 1, the pin bores 14, 14' are introduced into the regions intended as pin bosses 11, 11' according to FIG. 2. Subsequently, the piston blank 1 is clamped into a lathe, and afterwards, the lower skirt delimitation 20 and subsequently the top 2 of the piston blank 1, which yields the underside of the upper piston part 5, are finish-lathed, whereby the recess 7 for the closed, ring-shaped cooling channel, the recess 9 for the centrally situated cooling chamber, and circumferential welding surfaces 21 and 22 are finished. Furthermore, the radially outer surface 4 of the piston blank 1 is lathed over, in other words part of the outer surface 4 is lathed off. Finally, four overflows uniformly distributed over the circumference are drilled into the top land 8 between the recesses 7 and 9, of which the overflows 23 to 25 are visible in FIG. 2, because of the position of the section plane.

Figure 3:
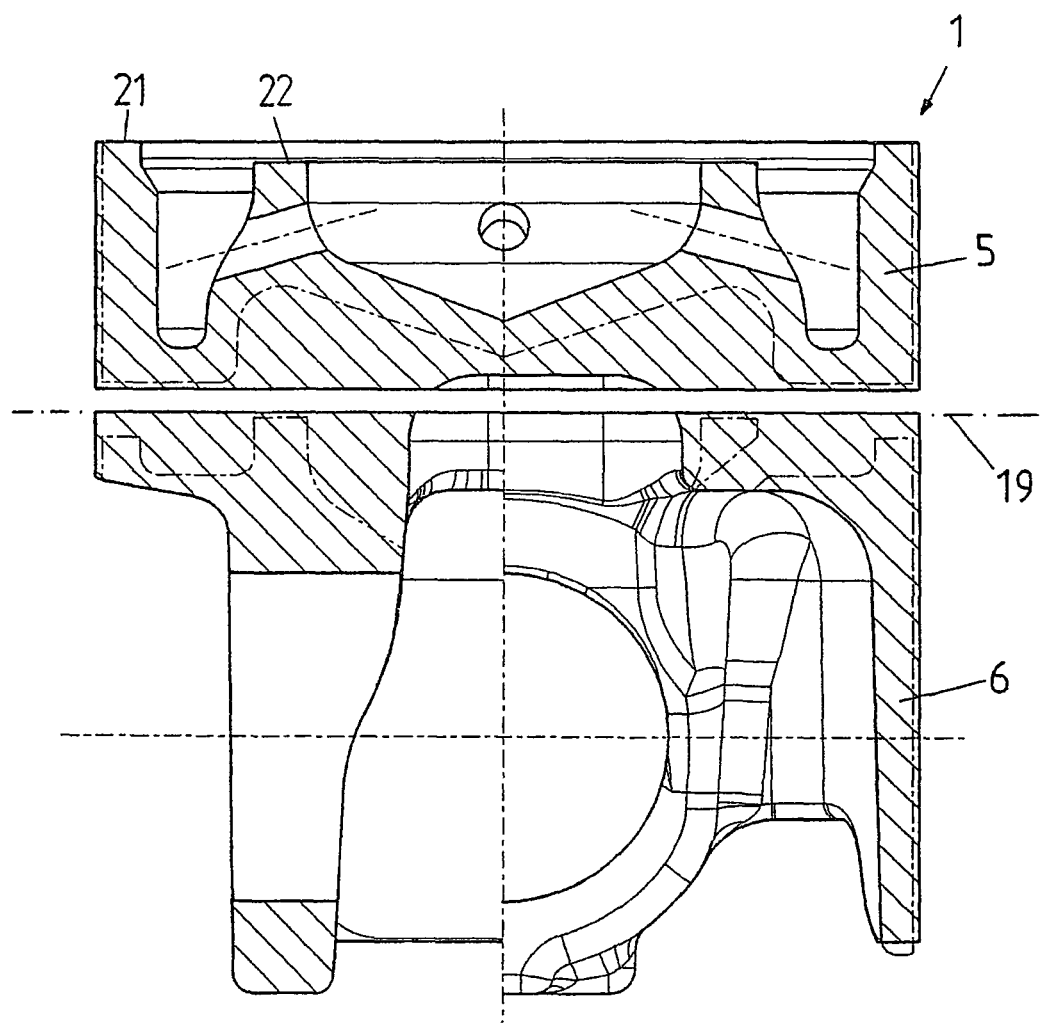

Subsequently, as shown in FIG. 3, the piston blank 1 is divided along the parting plane 19, whereby this separation can take place by means of sawing or by means of cutting, so that the two parts of the piston blank 1 intended for the upper piston part 5, on the one hand, and for the lower piston part 6, on the other hand, are obtained. The upper piston part 5 is then removed from the lathe.

Figure 4:
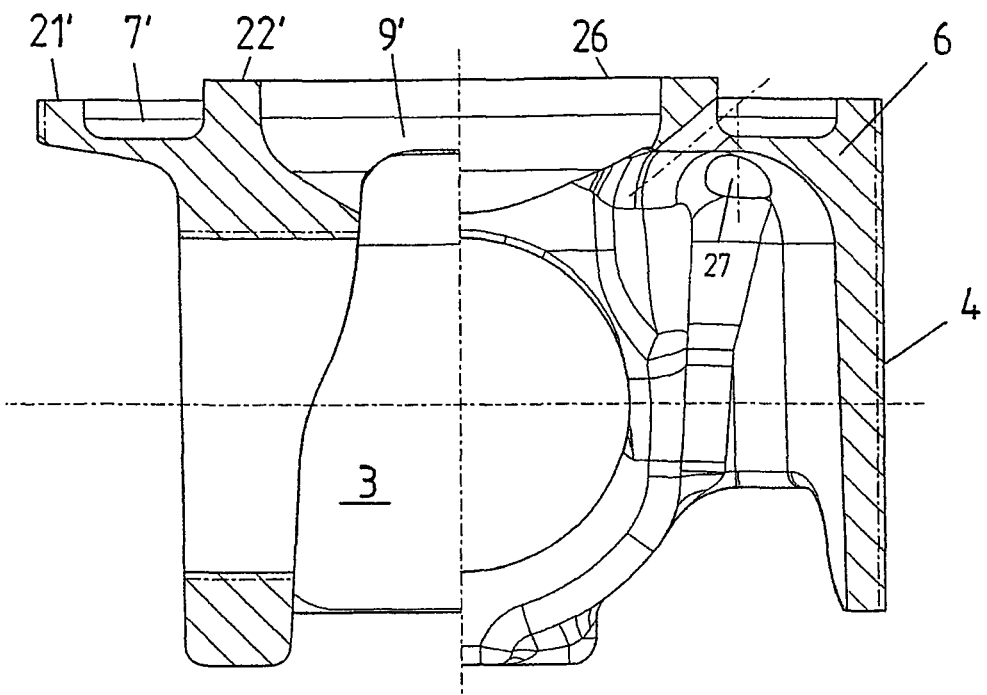

According to FIG. 4, the surface 26 on the piston crown side is finish-lathed on the lower piston part 6 that remains in the lathe, whereby the recess 7', which results in the ring-shaped cooling channel, together with the recess 7 of the upper piston part 5, the recess 9', which results in the radially inner cooling chamber, together with the recess 9 of the upper piston part 5, and the welding surfaces 21' and 22', which result in weld connections between the upper piston part 5 and the lower piston part 6, together with the welding surfaces 21 and 22 of the upper piston part 5, are completed.

Furthermore, at least one oil inflow opening 27 and at least one oil outflow opening (not shown) are introduced between the recess 7' and the interior 3 of the lower piston part 6.

Figure 5:
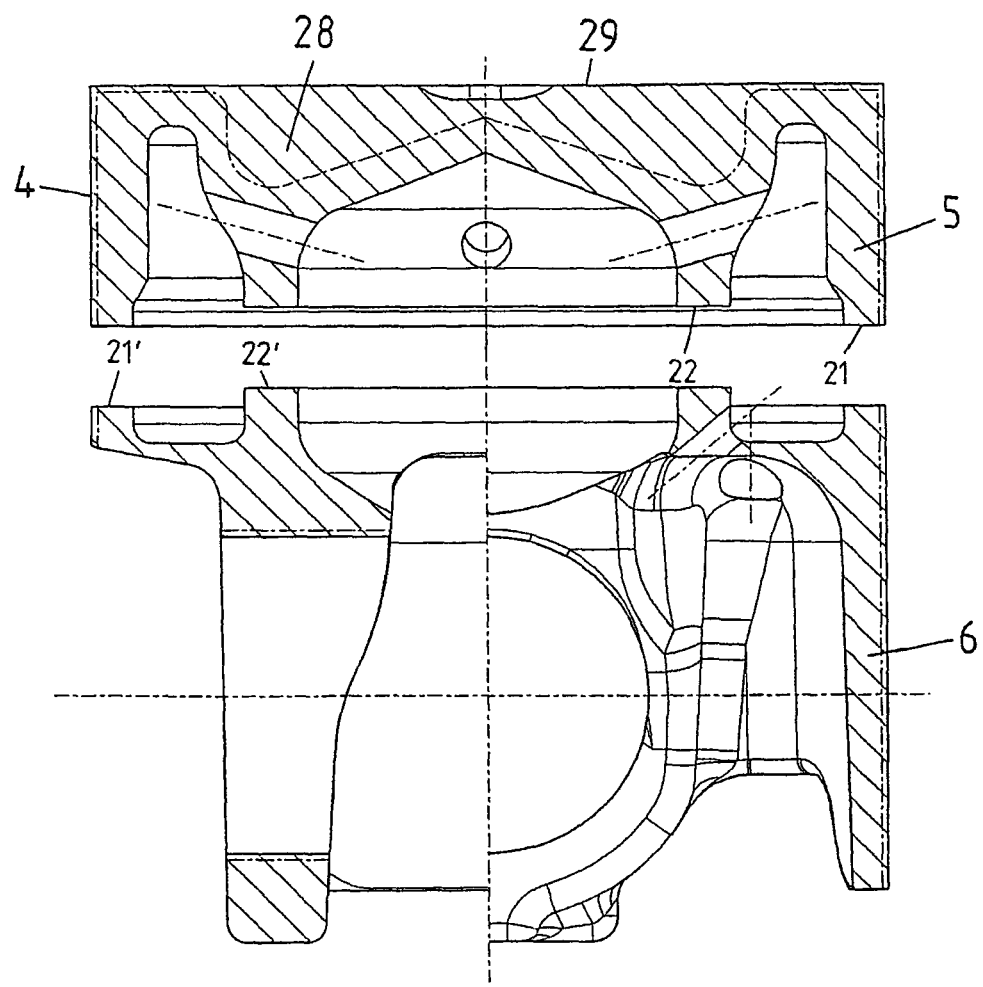

The lower piston part 6 is removed from the lathe, and the lower piston part 6 and the upper piston part 5 are clamped into a friction-welding machine, whereby the two parts 5 and 6 come to lie relative to one another as shown in FIG. 5, so that the two ring-shaped welding surfaces 21 and 21' and the two ring-shaped welding surfaces 22 and 22' lie opposite one another. The two parts 5 and 6 are now welded to one another by means of friction welding, in that the upper piston part 5 is put into a greater relative rotational motion as compared with the lower piston part 6, and the two parts 5 and 6 are pressed against one another with great force, by way of the welding surfaces 21, 21', 22, 22'.

Figure 6:
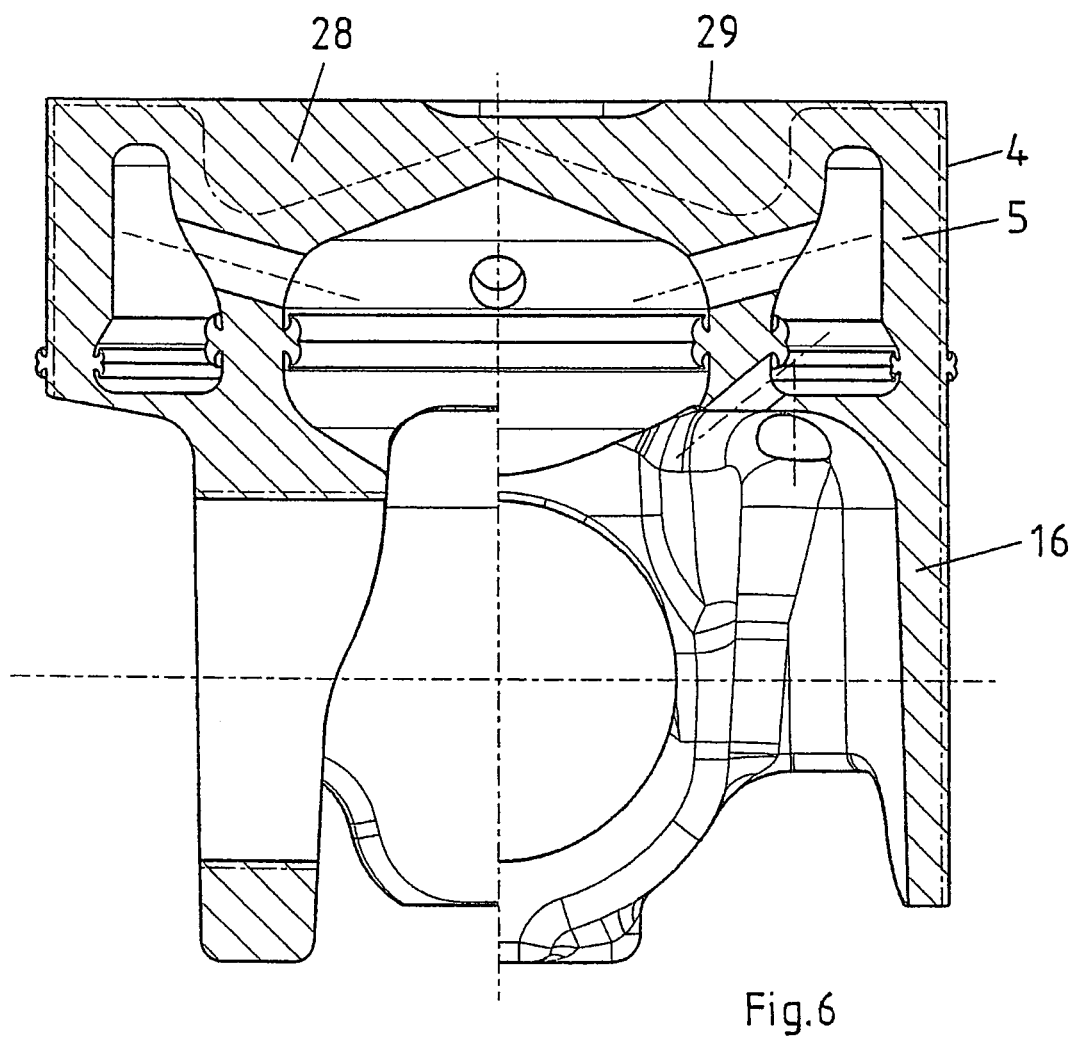
Figure 7:
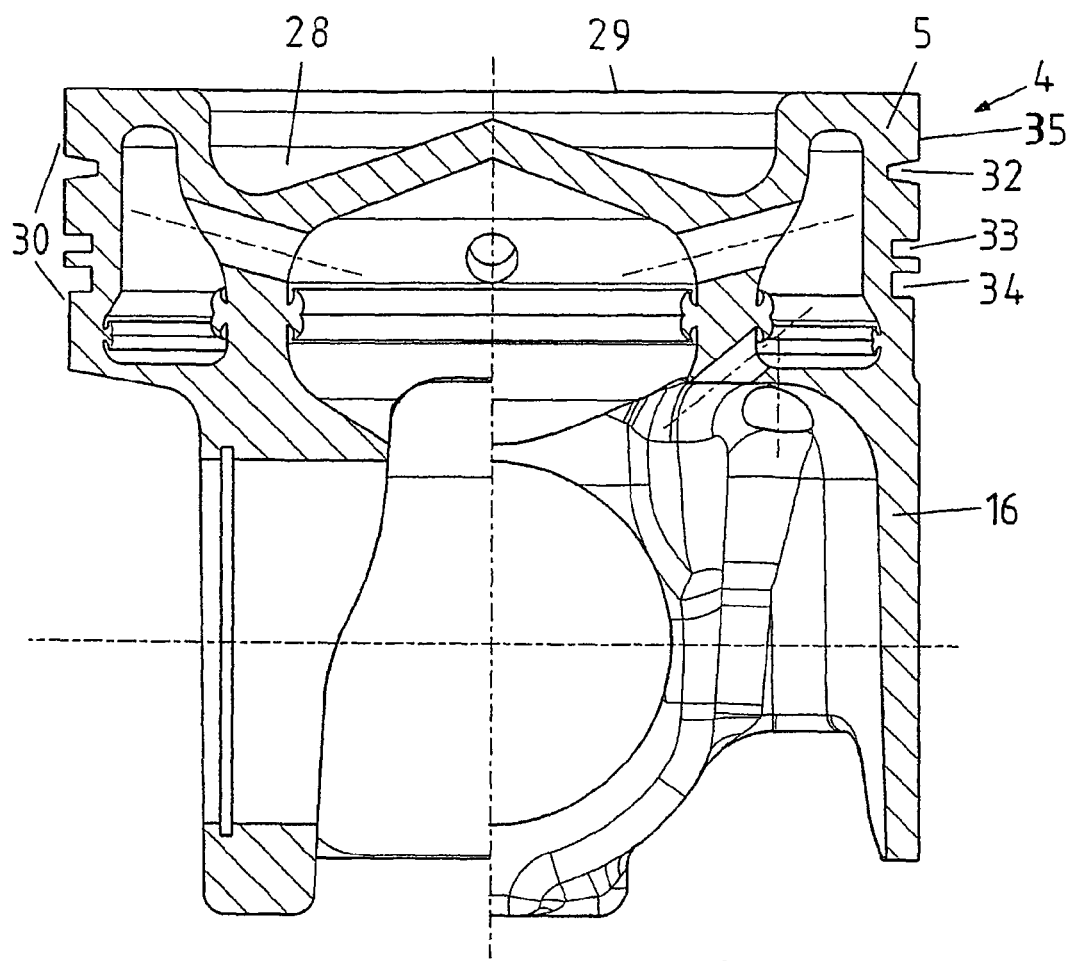

In a last method step, the partly finished piston shown in FIG. 6 is removed from the friction-welding machine and clamped back into the lathe, whereby the piston, as shown in FIG. 7, is finish-lathed. In this connection, a ring belt 30 having the piston ring grooves 32, 33, 34 and a top land 35 are lathed into the radial outside 4 of the upper piston part 5, and a combustion chamber bowl 28 is lathed into the piston crown 29. And the piston skirt 16 is finish-lathed. In this connection, the piston for an internal combustion engine shown in FIG. 7 is obtained.

The method according to the invention for production of a piston for an internal combustion engine has the advantage, in this connection, that a single lathe with integrated drilling/milling tools is sufficient for production of pistons composed of two parts that are joined together.

| Reference Symbol List | |
|---|---|
| 1 | piston blank |
| 2 | top of the piston blank 1 |
| 3 | interior of the piston blank 1 |
| 4 | radial outside |
| 5 | upper piston part, part |
| 6 | lower piston part, part |
| 7, 7', 7a | recess |
| 8 | ring land |
| 9, 9', 9a | recess |
| 10 | radially outer face side of the pin boss |
| 11, 11' | pin boss |
| 12 | radially inner face side of the pin boss |
| 13 | axis of the pin bore |
| 14, 14' | pin bore |

-continued

| Reference Symbol List | |
|---|---|
| 15 | inside of the skirt element |
| 16 | skirt element |
| 17 | piston axis |
| 18 | part of the interior |
| 19 | parting plane |
| 20 | lower skirt delimitation |
| 21, 21', 22, 22' | welding surface |
| 23, 24, 25 | overflow |
| 26 | surface of the lower piston part 6 |
| 27 | oil inflow opening |
| 28 | combustion chamber bowl |
| 29 | piston crown |
| 30 | ring belt |
| 32, 33, 34 | piston ring groove |
| 35 | top land |

What is claimed is:

1. Method for the production of a piston for an internal combustion engine, having a ring-shaped cooling channel that lies radially on the outside, and a cooling chamber that lies in the center, comprising the following method steps:
   forging a piston blank (1), from which an upper piston part (5) and a lower piston part (6) are formed,
   separating the upper piston part (5) from the lower piston part (6),
   machining a piston part to form recesses (7', 9') for a ring-shaped cooling channel,
   welding the upper piston part (5) to the lower piston part (6),
   finish-machining the piston to produce piston ring grooves (32, 33, 34), pin bores (14, 14'), and a combustion chamber bowl (28),
   wherein
   during forging of the piston blank (1), the top surface (2) of the piston blank (1) is partly given the shape of the underside of the upper piston part (5),
   during forging of the piston blank (1), the underside of the piston blank (1) is given a shape that corresponds to the interior (3) of the lower piston part (6),
   after forging of the piston blank (1) and before separation of the upper piston part (5) from the lower piston part (6), pin bores (14, 14') are introduced into regions of the piston blank (1) intended for the pin bosses (11, 11'), and the top surface (2) of the piston blank (1) is given the finished shape of the underside of the upper piston part (5) by means of a cutting machining method,
   after separation of the upper piston part (5) from the lower piston part (6), and before welding of the upper piston part (5) to the lower piston part (6), the surface (26) of the lower piston part (6) on the piston crown side is finish-machined, and
   wherein during welding, the upper piston part (5) is welded to the lower piston part in an inverted orientation so that the top surface (2) of the piston blank (1) becomes the underside of the upper piston part.

2. Method according to claim 1, wherein during forging of the piston blank (1), a circumferential recess (7a) is formed into the top (2) of the piston blank (1), radially on the outside, which recess partly corresponds to a recess (7) made in the underside of the upper piston part (5), which forms the upper part of the cooling channel in the finished, assembled piston.

3. Method according to claim 1, wherein during forging of the piston blank (1), a recess (9a) that lies in the center is formed into the top (2) of the piston blank (1), radially on the inside, which recess partly corresponds to a recess (9) made in the underside of the upper piston part (5), which delimits the upper part of a cooling chamber that lies in the center, in the finished piston.

4. Method according to claim 1, wherein after forging of the piston blank (1) and before separation of the upper piston part (5) from the lower piston part (6), a circumferential recess (7) is formed into the top (2) of the piston blank (1), by means of a cutting machining method, radially on the outside, which recess forms the upper part of the cooling channel in the finished, assembled piston.

5. Method according to claim 1, wherein after forging of the piston blank (1) and before separation of the upper piston part (5) from the lower piston part (6), a recess (9) that lies in the center is formed into the top (2) of the piston blank (1), by means of a cutting machining method, radially on the inside, which recess delimits the upper part of a cooling chamber that lies in the center, in the finished, assembled piston.

* * * * *